(12) United States Patent  
Zeiler et al.

(10) Patent No.: US 10,233,889 B2  
(45) Date of Patent: *Mar. 19, 2019

(54) SNOWTHROWER WITH REMOVABLE SELF-HEATING STARTER BATTERY PACK

(71) Applicant: Briggs & Stratton Corporation, Wauwatosa, WI (US)

(72) Inventors: Jeffrey Zeiler, Pewaukee, WI (US); Robert John Koenen, Pewaukee, WI (US); Dale Van Patten, New Berlin, WI (US); Jason Andrew Hansen, Elkhorn, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,682

(22) Filed: Jul. 7, 2017

(65) Prior Publication Data

US 2017/0306916 A1 Oct. 26, 2017

Related U.S. Application Data

(63) Continuation of application No. 14/624,643, filed on Feb. 18, 2015, now Pat. No. 9,726,135.

(60) Provisional application No. 62/031,196, filed on Jul. 31, 2014, provisional application No. 61/943,030, filed on Feb. 21, 2014.

(51) Int. Cl.
| | |
|---|---|
| *F02N 11/08* | (2006.01) |
| *E01H 5/09* | (2006.01) |
| *H02J 7/00* | (2006.01) |
| *F02N 11/12* | (2006.01) |

(52) U.S. Cl.  
CPC ......... *F02N 11/0862* (2013.01); *E01H 5/098* (2013.01); *H02J 7/0016* (2013.01); *H02J 7/0045* (2013.01); *F02N 11/0803* (2013.01); *F02N 11/12* (2013.01); *F02N 2011/0885* (2013.01); *F02N 2200/064* (2013.01)

(58) Field of Classification Search  
CPC .. E01H 5/098; F02N 11/0862; F02N 11/0803; F02N 11/12; F02N 2011/0885; F02N 2200/064; H02J 7/0016; H02J 7/0045; H02J 7/0042; H02J 7/0044  
See application file for complete search history.

(56) References Cited

U.S. PATENT DOCUMENTS

| | | |
|---|---|---|
| 5,039,927 A | 8/1991 | Centafanti |
| 5,208,525 A | 5/1993 | Lopic et al. |
| 5,990,661 A | 11/1999 | Ashtiani et al. |

(Continued)

*Primary Examiner* — Jamie L McGowan  
(74) *Attorney, Agent, or Firm* — Andrus Intellectual Property Law, LLP

(57) ABSTRACT

A snowthrower includes an internal combustion engine and a starter battery pack that provides electrical power to operate an electric starter motor. The starter battery pack is received within a receptacle of the snowthrower and is selectively coupled to the starter motor to initiate operation of the internal combustion engine. The starter battery pack can further include a battery heating circuit that is operable to heat the starter battery pack above ambient temperatures to increase the current output of the starter battery pack. The battery heating circuit includes a controller that utilizes electrical power from the starter battery pack to heat the starter battery pack.

11 Claims, 11 Drawing Sheets

(56) References Cited

U.S. PATENT DOCUMENTS

| | | | |
|---|---|---|---|
| 6,072,301 | A | 6/2000 | Ashtiani et al. |
| 6,230,678 | B1 | 5/2001 | Gracyalny et al. |
| 6,271,648 | B1 | 8/2001 | Miller |
| 6,311,663 | B2 | 11/2001 | Gracyalny et al. |
| 6,470,603 | B2 | 10/2002 | Hanafusa et al. |
| 7,180,200 | B2 | 2/2007 | Walter et al. |
| 7,309,928 | B2 | 12/2007 | Grant et al. |
| 7,540,102 | B2 | 6/2009 | Olmr et al. |
| 7,618,741 | B2 * | 11/2009 | Casalena ............... H02J 7/0042 320/112 |
| 7,687,926 | B2 | 3/2010 | Grant et al. |
| 7,782,626 | B2 | 8/2010 | Buck et al. |
| 7,989,969 | B2 | 8/2011 | Grant et al. |
| 8,159,078 | B2 | 4/2012 | Usselman et al. |
| 8,319,357 | B2 | 11/2012 | Usselman et al. |
| 8,452,490 | B2 | 5/2013 | Lakirovich et al. |
| 8,574,738 | B2 | 11/2013 | Fattig |
| 8,733,072 | B2 | 5/2014 | Hansen et al. |
| 8,857,138 | B2 | 10/2014 | Hansen et al. |
| 9,340,121 | B2 | 5/2016 | Schwarz et al. |
| 2006/0170218 | A1 | 8/2006 | Grant et al. |
| 2009/0223475 | A1 | 9/2009 | Wilson et al. |
| 2013/0111864 | A1 | 5/2013 | Hansen et al. |
| 2013/0111865 | A1 | 5/2013 | Hansen et al. |
| 2013/0343906 | A1 | 12/2013 | Funke et al. |
| 2014/0230393 | A1 | 8/2014 | Hansen et al. |
| 2014/0299089 | A1 | 10/2014 | Koenen et al. |
| 2015/0240773 | A1 | 8/2015 | Koenen et al. |
| 2015/0240774 | A1 | 8/2015 | Zeiler et al. |

* cited by examiner

100
SNOWTHROWER WITH REMOVABLE SELF-HEATING STARTER BATTERY PACK

CROSS-REFERENCE TO RELATED APPLICATIONS

The present application is a continuation of U.S. patent application Ser. No. 14/624,643, filed on Feb. 18, 2015 and issued as U.S. Pat. No. 9,726,135, which claims priority to U.S. Provisional Patent Application Ser. No. 61/943,030 filed on Feb. 21, 2014 and U.S. Provisional Patent Application Ser. No. 62/031,196 filed on Jul. 31, 2014, the disclosures of which are incorporated herein by reference.

BACKGROUND

The present disclosure relates to a starter battery pack tar use with outdoor power equipment, such as a snowthrower. More specifically, the present disclosure relates to a self-warming circuit that uses power stored within the starter battery pack to heat the starter battery pack to increase the output, especially at low operating temperatures.

The use of snowthrowers (or snowblowers) by both commercial and residential operators is common for those located in snowy winter climates. These snowthrowers may be walk-behind units or may be propelled by other machinery (e.g., all-terrain vehicles, tractors, etc.). Typically, snowthrowers are divided into two categories: single-stage snowthrowers and multi-stage snowthrowers. Single-stage snowthrowers generally incorporate an impeller assembly that is driven by an internal combustion engine (or similar prime mover, such as an electric motor) to perform the functions of propelling the snowthrower forward, lifting snow from the surface to be cleared, and ejecting the snow out of a discharge chute. Alternatively, a multi-stage snowthrower comprises a separate auger assembly and impeller assembly. Both the auger assembly and impeller assembly are driven by an internal combustion engine (or similar prime mover). The auger assembly rotates near the surface to be cleared in order to lift and direct snow and debris to the impeller assembly, which rotates along an axis perpendicular to the axis of rotation of the auger assembly. The impeller assembly then acts to eject snow out of a discharge chute.

Conventionally, the engines of both single-stage and multi-stage snowthrowers have been started using recoil rope-pull starters. These types of starters require the operator to physically pull a rope to start the engine. In fact, multiple rope pulls are often required before the engine begins to run, particularly during cold weather. Such physical interaction necessary to start the engine is generally undesirable, as some operators may not be capable of using a rope-pull starter even once, let alone multiple times.

As an alternative to rope-pull type starters, some snowthrowers are equipped with electric starter motors that are selectively coupled to a geared flywheel to initiate starting. However, a disadvantage of this type of electric starter system is that it generally requires a 110V corded electric input to provide the electricity to run the starter. This dictates that the operator be near a suitable electrical outlet (and have a suitable electrical cord) at the time of starting if they wish to utilize the electric starter functionality. Given the variety of locations in which snowthrowers are used, this is not always the case.

Accordingly, it would be advantageous to have a snowthrower capable of battery powered electric starting. Since lead acid batteries suffer from significant disadvantages when not used for extended periods of time or in cold environments, a lithium ion starter battery pack is a contemplated replacement for a 110V corded electric input to provide the electricity to run the starter. Lithium ion starter battery packs can be configured to generate the required high starting current and can be easily recharged. However, the output of a lithium ion starter battery pack significantly decreases as the ambient temperature decreases. Thus, a solution that also increases the output of the starter battery pack at low ambient temperature would be a significant advancement.

SUMMARY

The present disclosure relates to a starting system for outdoor power equipment, such as a snowthrower. The starting system includes an electric starter motor that receives a supply of electricity from a starter battery pack. In one embodiment of the disclosure, the starter battery pack includes a plurality of individual battery cells. The battery cells are preferably lithium ion battery cells that combine to form the starter battery pack.

The starter battery pack is received within a battery receptacle formed as part of the snowthrower. The battery receptacle provides a point of electrical connection between the starter battery pack and the starter motor. An activating device, such as but not limited to a key switch, resistive or capacitive touch sensor or push button, is positioned between the battery receptacle and the starter motor. Movement of the activating device to an activated position provides electricity from the starter battery pack to the stoner motor to start the internal combustion engine.

The starting system of the present disclosure can further include a battery heating circuit that operates to heat the starter battery pack above ambient temperature. Heating the starter battery pack above ambient increases the current output of the starter battery pack, which allows for the starter motor to start the internal combustion engine. In one embodiment of the disclosure, the battery heating circuit includes a resistive heating pad that is positioned in close physical proximity to the individual cells of the starter battery pack. When a controller determines that heating of the starter battery pack is required, the controller connects the starter battery pack to the resistive heating pad to heat the starter battery pack.

In another embodiment, the battery heating circuit includes at least one energy storage device, such as a capacitor. When the controller determines that the starter battery pack needs heating, the controller actuates one or more switches or other similar solid state switching devices, such as transistors or MOSFETs, to connect the battery cells to the energy storage device or devices. The flow of electrons from the battery cells to the energy storage devices causes the temperature of the battery cells to increase, which heats the starter battery pack. Once the engine has started, the controller adjusts the position of the switches to discharge the energy storage devices back to charge the battery cells. In this manner, the flow of electrons heats the battery cells without overly discharging the starter battery pack.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
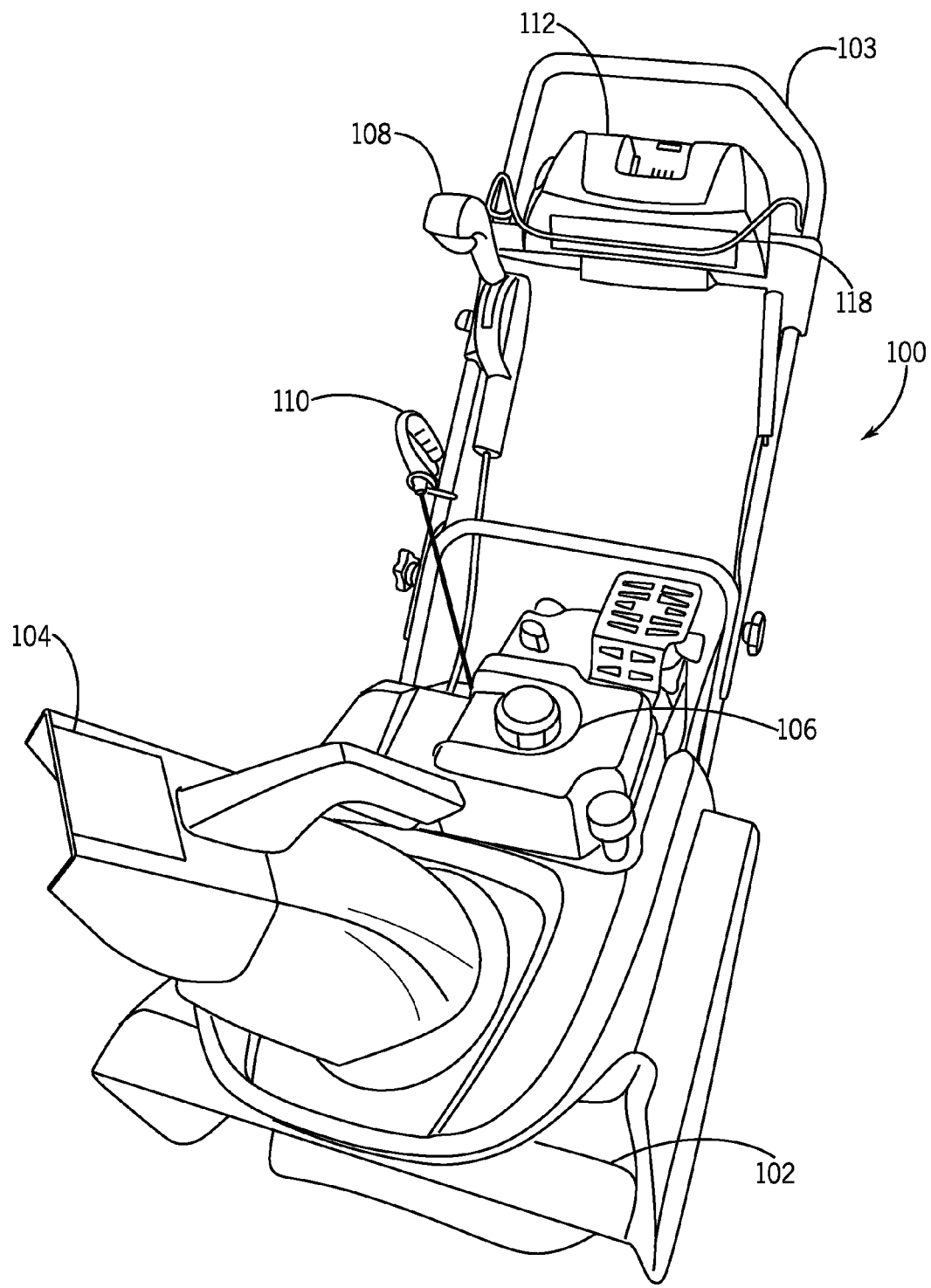
FIG. 1 illustrates a single-stage snowthrower with a removable starter battery panel in accordance with an exemplary embodiment.

Referring to FIG. 1, a single-stage snowthrower 100 is shown. While the following description relates to a single-stage snowthrower and its components, the concepts described herein are also applicable to multi-stage snowthrowers and other types of outdoor power equipment that includes an internal combustion engine and is used in cold weather operating conditions. Snowthrower 100 comprises an impeller housing 102 having are impeller therein. The impeller rotates at a high speed (e.g., 1100 rpm) to both lift and throw snow away from the snowthrower unit and propel snowthrower 100 forward along a desired path. The operator pushes (or pulls) the snowblower along that desired path via a handle assembly 103, wherein the user pulls engagement bar 118 to enable the impeller to rotate. Snow that is lifted by the impeller is thrown from a rotatable chute 104, wherein the direction of the rotatable chute 104 is manipulated by the operator via a chute direction control 108. Other means of rotating chute 104 are also possible (i.e., by hand, via motorized rotation, etc.).

Snowthrower 100 further comprises an internal combustion engine 106 used to drive the impeller and/or drive wheels of the unit internal combustion engine 106 may be a horizontal shaft or vertical shaft engine. Conventionally, engine 106 is started via a recoil, rope-pull starter 110. As described above, the operator must pull on the rope to start the engine. However, in accordance with the exemplary embodiment, snowthrower 100 further comprises an electric starter motor (not shown which utilizes electrical energy provided by a removable starter battery pack mounted within a panel 112. As will be described in more detail below, the removable starter battery pack is received in a battery receptacle on panel 112 for easy operator access and greater overall functionality.

Figure 2:
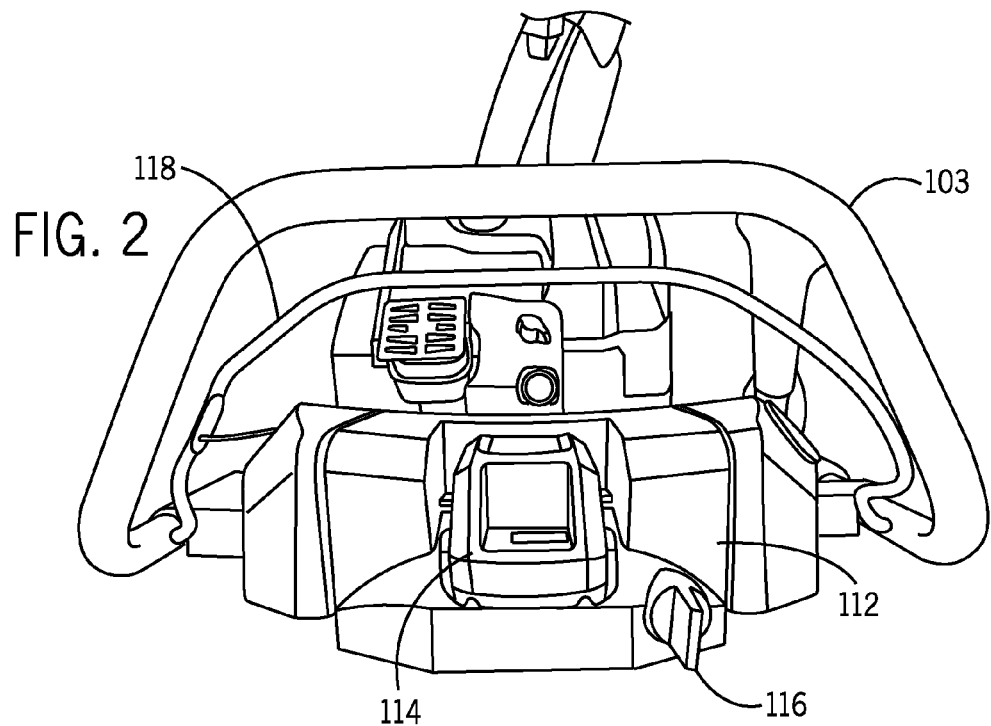
FIG. 2 illustrates a top view of a single-stage snowthrower with removable starter battery pack and panel in accordance with an exemplary embodiment.
Figure 3:
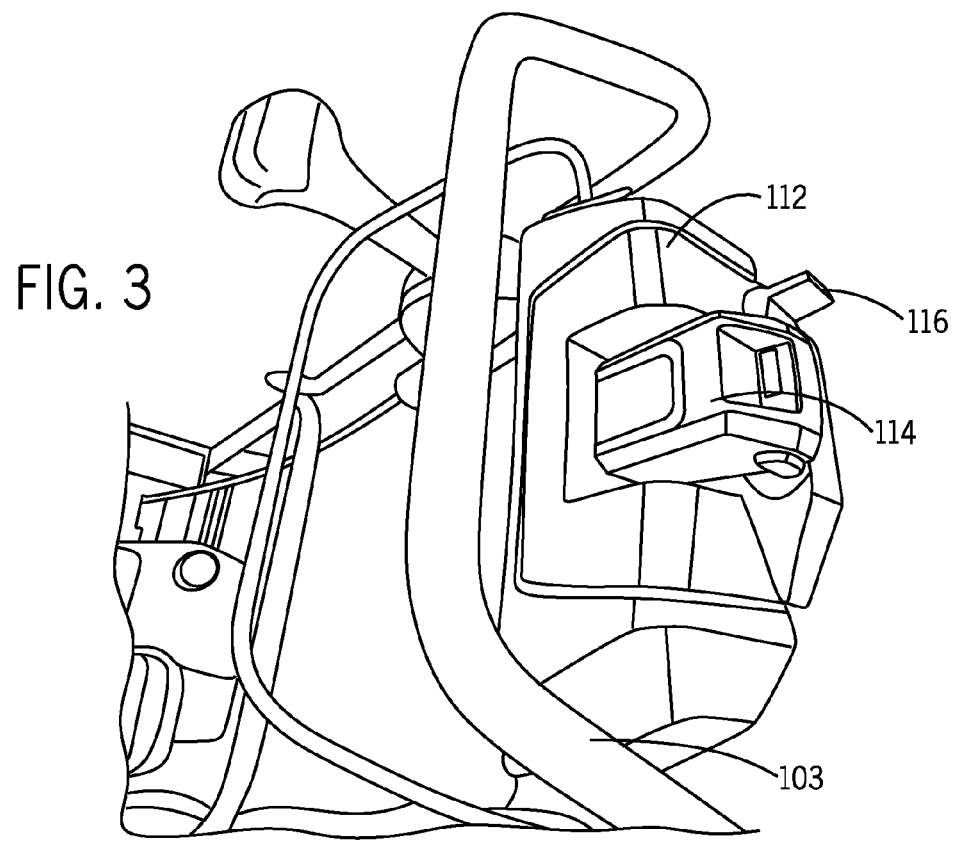
FIG. 3 illustrates a side view of a single-stage snowthrower with removable starter battery pack and panel in accordance with an exemplary embodiment.

FIG. 2 and FIG. 3 show a top view of panel 112 on snowthrower 100. Panel 112 comprises a mourning receptacle for a starter battery pack 114. Although the starter battery pack 114 is shown as being removable from the receptacle, the starter battery pack 114 could be mourned to the snowthrower and recharged in place. In the embodiment shown, the starter battery pack 114 is preferably a lithium ion (Li-Ion) battery that is capable of being retained in the mounting receptacle via one or more known methods (e.g., sliding engagement, latched engagement, etc.). However, starter battery pack 114 could comprise any suitable battery chemistry. The starter battery pack 114 acts as a starting battery for providing electrical energy to an electric starter motor mounted on the internal combustion engine. When an activating device, such as a rotatable key switch 116, is turned by the operator, electrical energy from the removable starter battery pack 114 is delivered to the electric starter motor. The electric starter motor operates to start the internal combustion engine. Alternatively, other activating devices operable to initiate the electric starter motor and starting the engine are possible, such as a resistive or capacitive touch sensor, a push-button located on panel 112, or a push-button incorporated into removable battery pack 114 itself, etc.

As removable starter battery pack 114 is conveniently located on panel 112, the operator can easily remove the starter battery pack 114 if and when it requires recharging. Alternatively, the starter battery pack 114 could be received in a receptacle positioned at other locations on the snowthrower, such as on the frame, the shroud or even on the engine. In an embodiment in which the starter battery pack 114 is not removable, the starter battery pack would be recharged in place on the snowthrower or other outdoor power equipment. As described above, a main deterrent from the use of batteries to power electric starter motors on snowthrowers and other cold-weather outdoor power equipment was the tendency for batteries to have increased internal resistance which limits current flow in such low temperatures.

Figure 4:
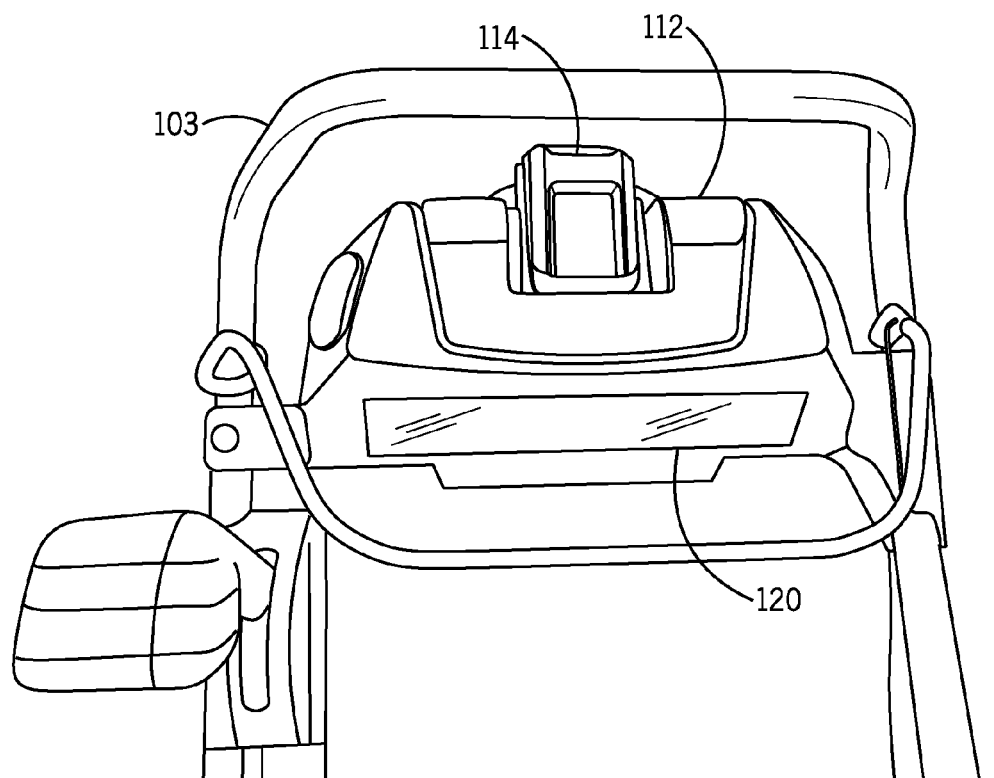
FIG. 4 illustrates a front view of a single-stage snowthrower with removable starter battery pack and panel in accordance with an exemplary embodiment.

Referring to FIG. 4, a front view of panel 112 on snowthrower 100 is illustrated. A light 120 is mounted on the front of panel 112 to illuminate the path of snowthrower 100. Light 120 may be powered by removable starter battery pack 114. In fact, removable starter battery pack 114 may also power other electrical loads on the unit, such as a motor-driven chute, etc.

Figure 5:
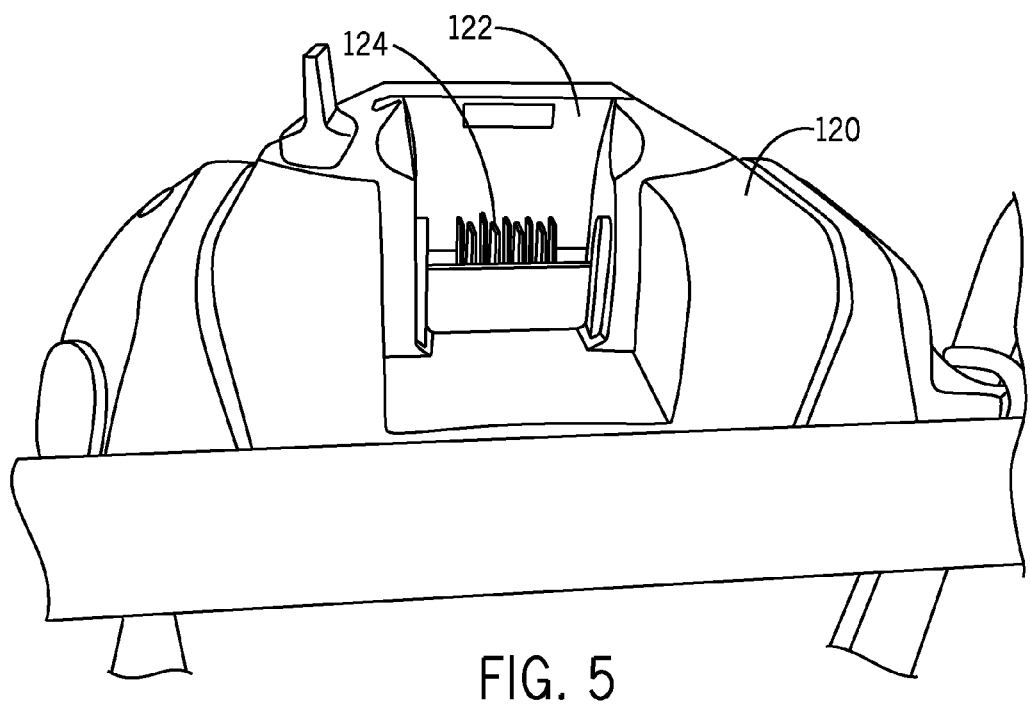
FIG. 5 illustrates a top view of a single-stage snowthrower panel with removable starter battery receptacle in accordance with an exemplary embodiment.
Figure 6:
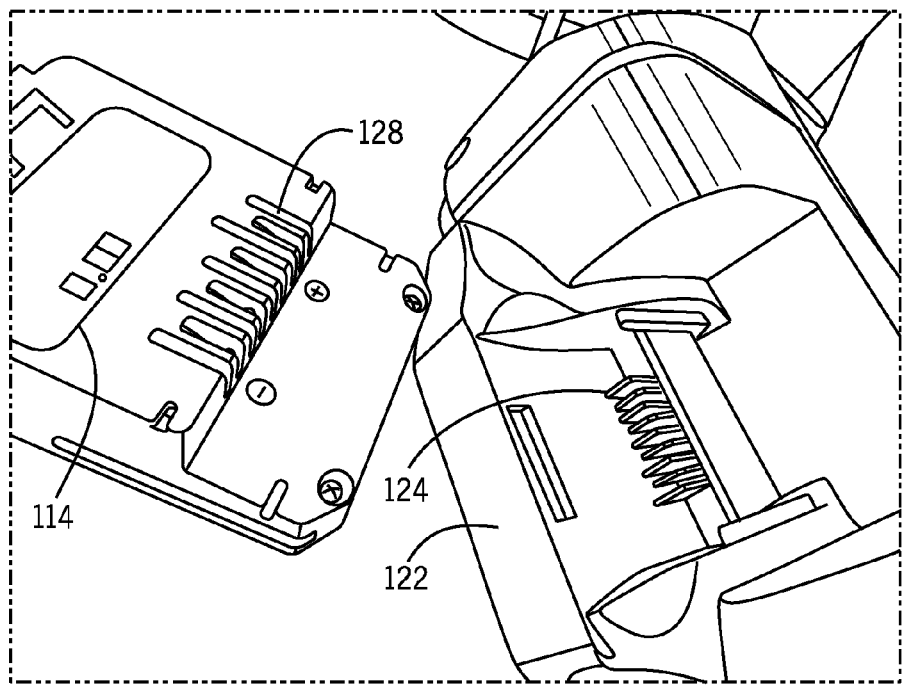
FIG. 6 illustrates a single-stage snowthrower panel with removable starter battery and battery receptacle in accordance with an exemplary embodiment.
Figure 7:
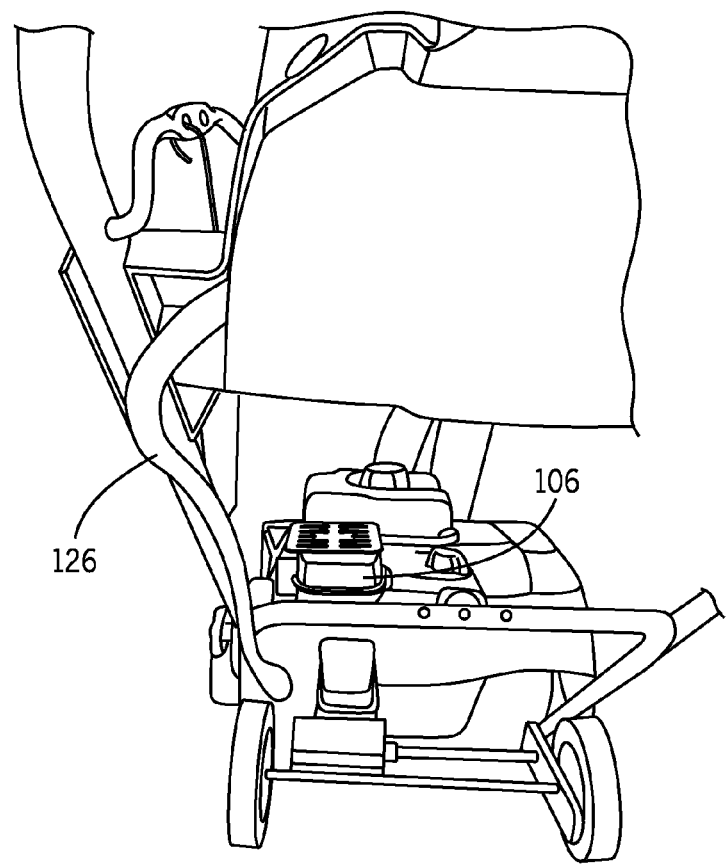
FIG. 7 illustrates a rear view of a single-stage snowthrower panel with removable starter battery receptacle coupled to a wiring conduit in accordance with an exemplary embodiment.

FIG. 5 and FIG. 6 show a battery receptacle 122 on panel 112. Removable starter battery pack 114 is slidably engaged within battery receptacle 122 such that battery pack 114 is secured on panel 112. Others types of engagement are also within the scope of this concept. Battery receptacle 122 has a plurality of electrical contacts 124 which are electrically connected to at least the starter motor (via a wiring conduit 126 shown in FIG. 7) to deliver electrical power to the electric starter motor of engine 106. Starter battery pack 114 has a plurality of comparable electrical contacts 128 that mate with contacts 124 of receptacle 122. The configuration of these contacts may vary and could be something other than physical contacts (inductive, etc.).

In accordance with another exemplary embodiment, the starter battery pack 114 may also be configured to be a security device to prevent unauthorized starting of the snowthrower 100 or other outdoor power equipment. That is, starter battery pack 114 may be electronically configured to be unique to the particular piece of equipment that it is to be mounted to, not unlike a garage door opener or remote-entry fob for a vehicle. A transmitter associated with the starter battery pack 114 may sync to a receiver located on the piece of equipment to be started to allow for a "handshake" authorization to start the engine of the equipment. Thus, not only can the operator ensure that the engine will not be started if a battery is not mounted to the appropriate receptacle, but the equipment may further limit the particular battery used to start the engine. This configuration provides greater security and ensures that only authorized use of the equipment is possible.

Figure 15:
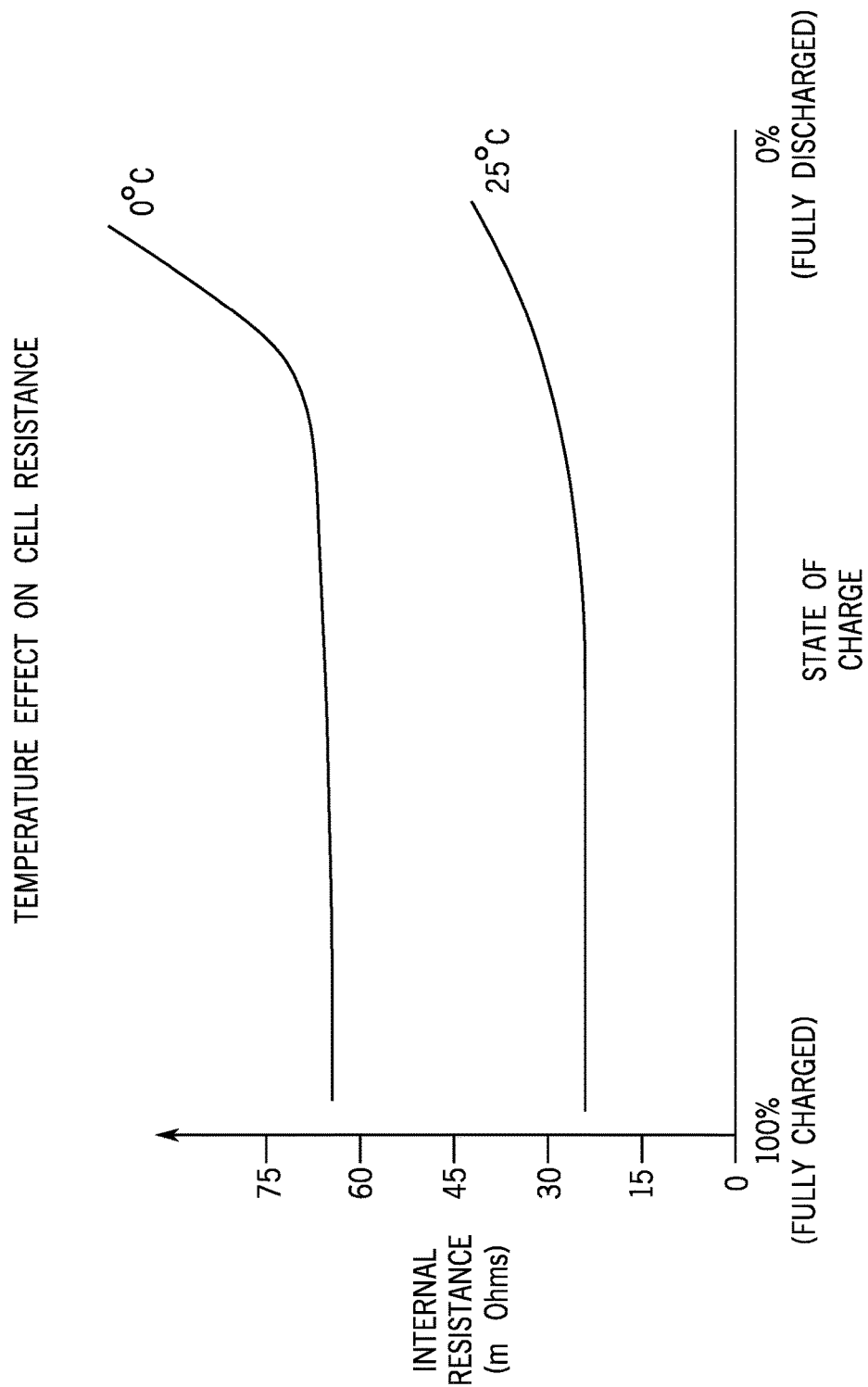
FIG. 15 is a graph illustrating how the internal resistance of the starter battery pack increases with a temperature drop.

Although a lithium ion starter battery pack 114 provides the required current (150-200 amps) and voltage for operating the electric starter motor of a snowthrower, lithium ion battery packs suffer from a reduction in the amount of current they can generate as the ambient temperature decreases. As shown in the graph of FIG. 15, the poor performance of Li-ion batteries at subzero temperatures has been linked to a significant increase in internal resistance at low temperatures. A tenfold increase in resistance relative to room temperature has been measured for cells at −20° C. This increase in the internal resistance results in a reduction in the amount of current that can be generated by the lithium ion starter battery pack, which reduces the effectiveness of the starter battery pack in cold weather climates, which is the environment where most snowthrowers and other types of outdoor power equipment including internal combustion engines are utilized. In order to address this problem, the present disclosure provides a self-warming system that allows the lithium ion battery pack to heat itself prior to providing current to the electric starter motor used with the snowthrower.

Figure 8:
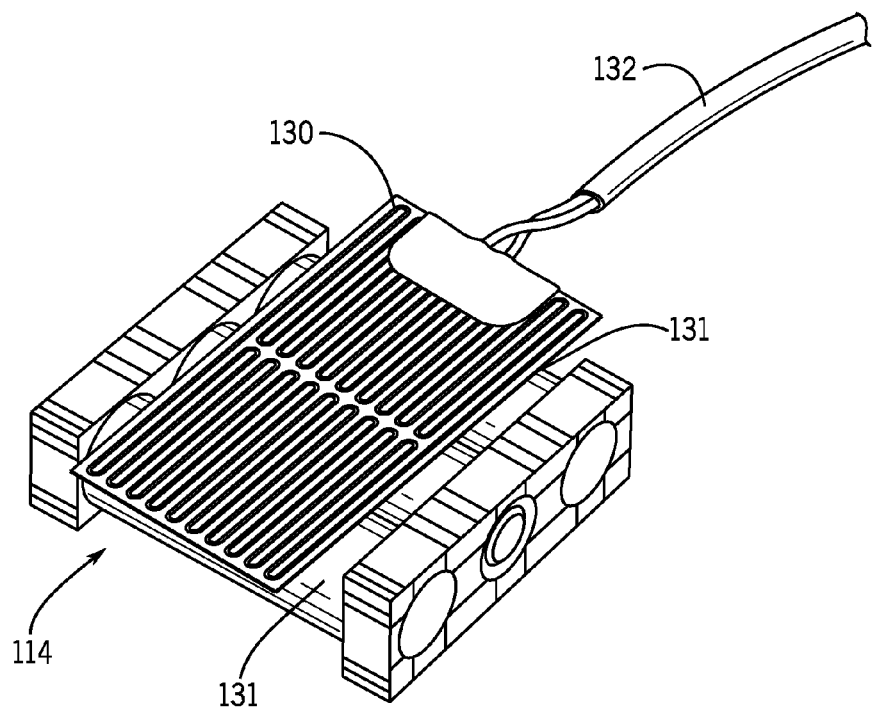
FIG. 8 illustrates a lithium ion (Li-Ion) starter battery pack with a heating pad installed.

FIG. 8 provides one illustrative example of a lithium ion starter battery pack 114 used in accordance with the present disclosure. The lithium ion starter battery pack 114 includes multiple cells 131 and the starter battery pack 114 can be received in a receptacle on the snowthrower, as previously described.

Figure 9:
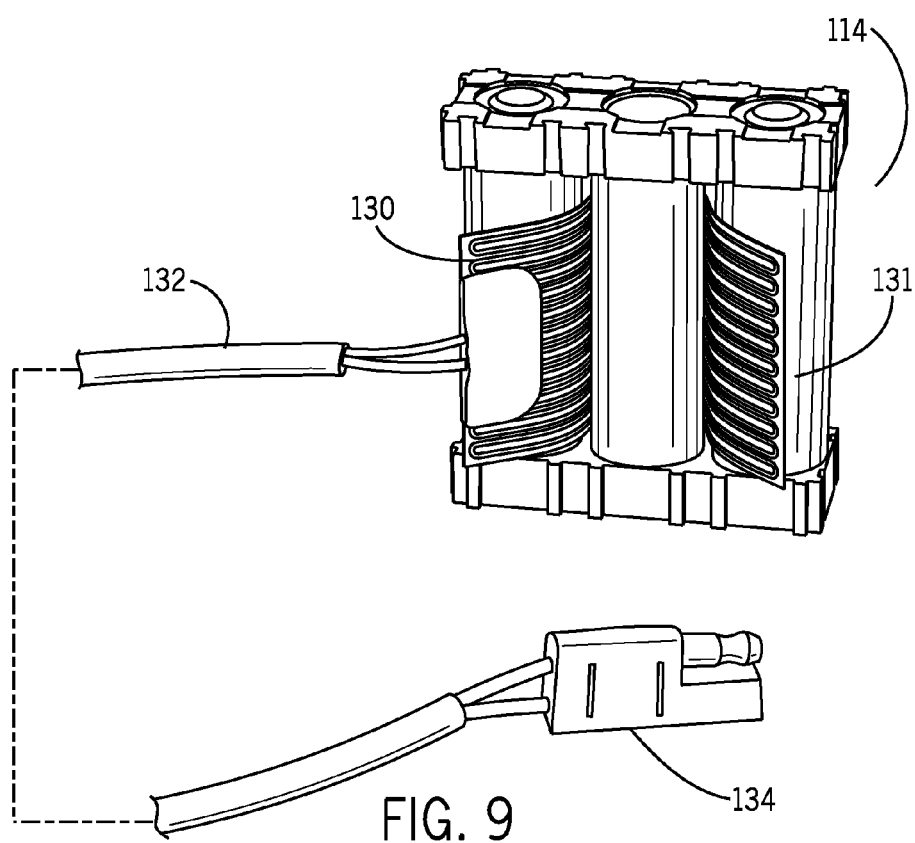
FIG. 9 illustrates the heating pad integrated between the individual cells of the starter battery pack.

FIGS. 8 and 9 illustrate a heating pad 130 that can be placed in close physical proximity to or in direct contact with or interwoven between the individual cells 131 of the lithium ion battery pack 114. The heating pad 130 is activated to supply heat by receiving a source of electricity through a cable 132 and associated plug 134. When electrical power is provided to the plug 134, internal resistive elements contained within the heating pad 130 generate heat. When the heating pad 130 is positioned in contact with the lithium ion starter battery pack 114, the heating pad 130 elevates the temperature of the battery pack relative to ambient.

Figure 10:
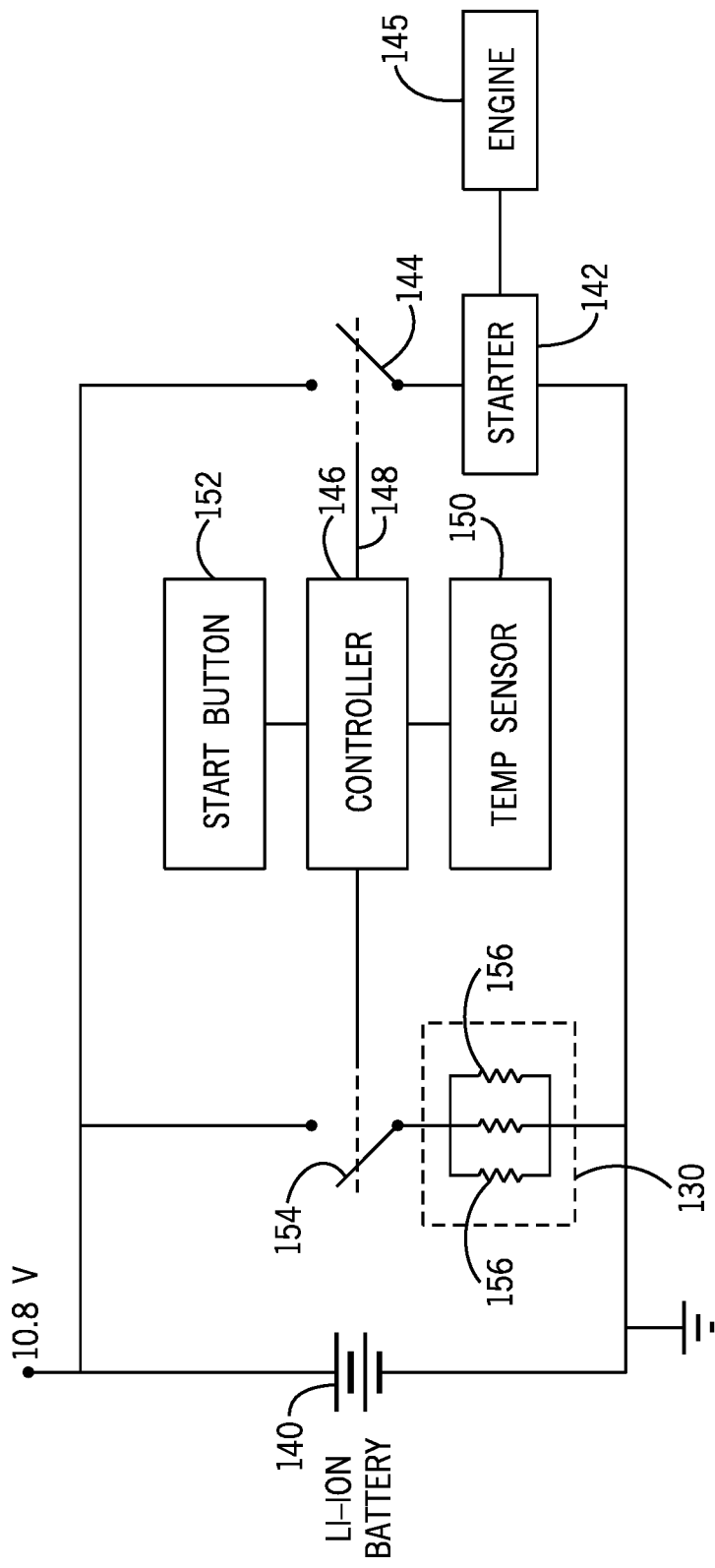
FIG. 10 illustrates one embodiment of a circuit used to self-heat the starter battery pack.

FIG. 10 illustrates one circuit and system that can be utilized as a self-heating circuit for the lithium ion starter battery pack. As shown in the system diagram of FIG. 10, the lithium ion battery 140 is connected to an electric starter motor 142 of the snowthrower through a starting switch 144. The position of the starting switch 144 is controlled by the controller 146 through a control line 148. When the controller doses the switch 144, current and voltage from the lithium ion battery 140 is supplied to the electric starter motor 142. Upon receiving such current, the starter motor 142 activates and starts the internal combustion engine 145 of the snowthrower. Once the internal combustion engine 145 has started, the controller 146 again opens the switch 144 to interrupt the flow of power from the battery 140 to the starter motor 142.

As shown in FIG. 10, the controller 146 is connected to a temperature sensor 150 and a start button 152. When the user depresses the start button 152, the controller 146 reads the current value of the temperature sensor 150 to determine whether the self-heating function for the battery 140 is required. If the controller 146 determines that the temperature is below an ambient temperature threshold, the controller closes the self-heating switch 154. When the self heating switch 154 is closed, current from the lithium ion battery 140 flows through the heating pad 130.

As illustrated in FIG. 10, the heating pad 130 includes a series of resistive elements 156 connected in parallel with each other across the battery 140. When the switch 154 is closed, current flows through the resistive elements 156, which generates heat. As discussed previously, the heating pad 130 can be positioned in contact with the starter battery pack, which heats the individual cells of the starter battery pack. The heat applied to the starter battery pack increases the output of the individual cells of the starter battery pack. Once the temperature of the starter battery pack has been elevated, the starter battery pack can generate the required amount of current, which can be applied to the electric starter motor 142 through the switch 144. In this manner, the lithium ion battery pack can self-heat. Although the self-heating process will result in a slight reduction in the stored capacity of the starter battery pack, the heating of the battery pack will increase the output of the battery pack to a sufficient level to start the snowthrower.

Figure 11:
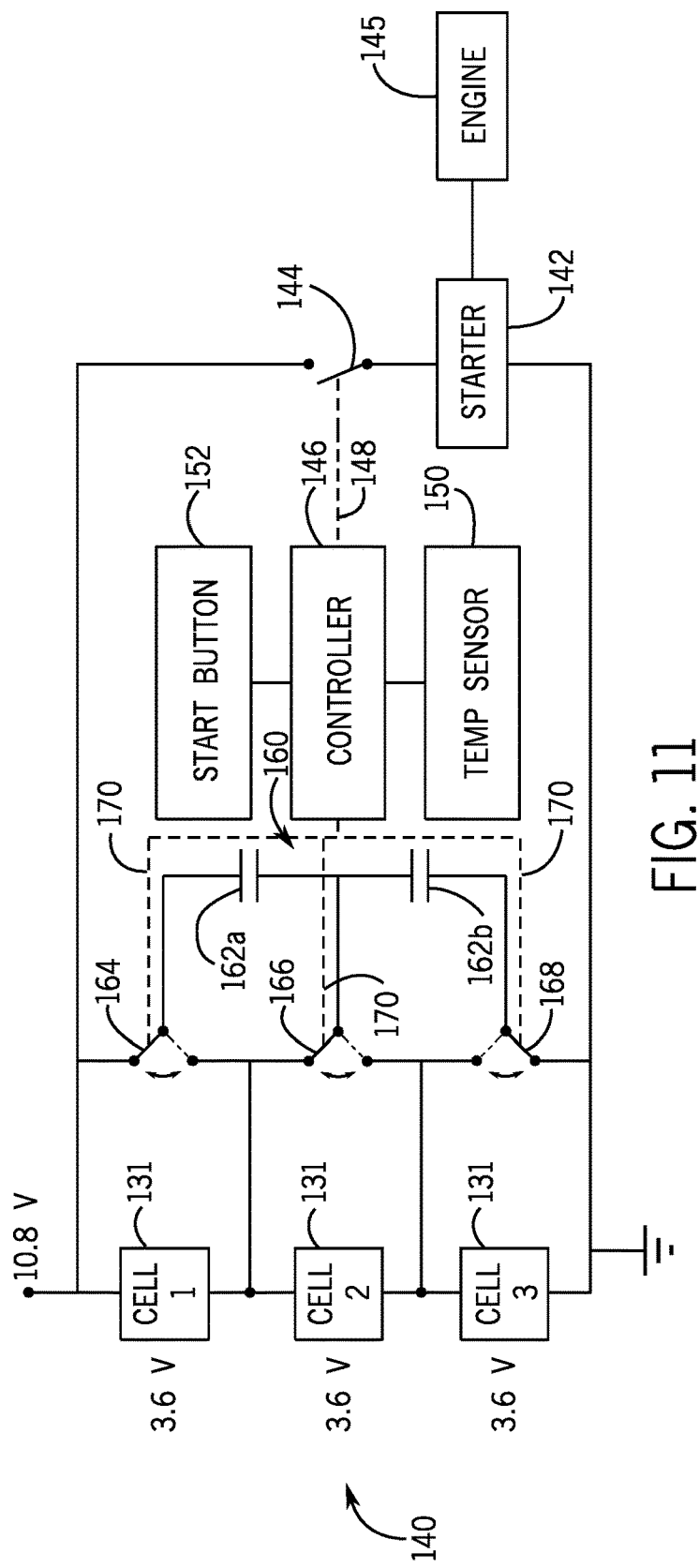
FIG. 11 illustrates a second embodiment of a circuit used to self-heat the starter battery pack.

FIG. 11 illustrates a second embodiment of a starting circuit in accordance with the present disclosure. As with the embodiment shown in FIG. 10, the starting circuit includes a controller 146 coupled to receive signals from both a temperature sensor 150 and the start button 152. The controller 146 controls the position of the switch 144 to supply power from the battery 140 to the electric starter motor 142. In the embodiment shown in FIG. 11, the battery 140 includes three individual cells 131 that are selectively connected to a storage circuit 160 rather than to a heating pad as in the embodiment of FIG. 10. The storage circuit 160 includes a pair of capacitors 162a and 162b that are connected in series with each other. The first capacitor 162a is connected between a first switch 164 and a second switch 166. The second capacitor 162b is connected between the second switch 166 and a third switch 168. The switches 164, 166 and 168 are each controlled by the controller 146 through control lines 170. The two capacitors 162a, 162b allow the battery pack 140 to discharge electrons that are then stored by the capacitors based upon the position of the switches 164, 166 and 168. By connecting, disconnecting and switching connections, current can be directed into and out of the individual cells 131. For example, the 10.8 volts from the battery 140 can be discharged from the three separate cells 131 into the two capacitors 162a, 162b. Then, current from the charged capacitors can be directed back into the cells to recharge the cells. The controller selectively positions the switches 164, 166 and 168 to keep the cells 131 balanced. The controller 146 functions to prevent the cells from getting unbalanced (i.e., by keeping the voltage of the cells within approximately 0.3 volts of each other).

As an example, when switches 164, 166 and 168 are in the positions shown and switch 144 is open, voltage from the cell 1 begins to charge capacitor 162a, while cell 2 and cell 3 begin to charge capacitor 162b. Discharging of the capacitors is also controlled by the position of switches 164, 166 and 168. The pair of capacitors 162a, 162b store electric power from the battery pack 140. The movement of electrons from the battery pack 140 to the capacitors 162a, 162b causes the individual cells 131 of the battery pack 140 to begin to heat. Thus, unlike the embodiment shown in FIG. 10, the embodiment of FIG. 11 utilizes the movement of electrons from the battery pack 140 to the capacitors 162a, 162b to heat the battery pack 140.

Once the battery pack 140 has reached a required temperature, the controller 146 moves the switches 164, 166 and 168 into the desired positions and closes the switch 144 to provide power from the battery pack 140 to the electric starter motor 142 to start the engine 145. Once the engine 145 has started, the switch 144 is opened to prevent further discharge of the starter battery pack 140.

After the engine starts, the controller 146 moves the switches 164, 166 and 168, which allows the charged capacitors 162a, 162b to begin to recharge the battery 140. Thus, the stored charge on the battery is not lost and is instead used to both charge the battery 140 and provide additional power to the electric starter motor 142.

Figure 12:
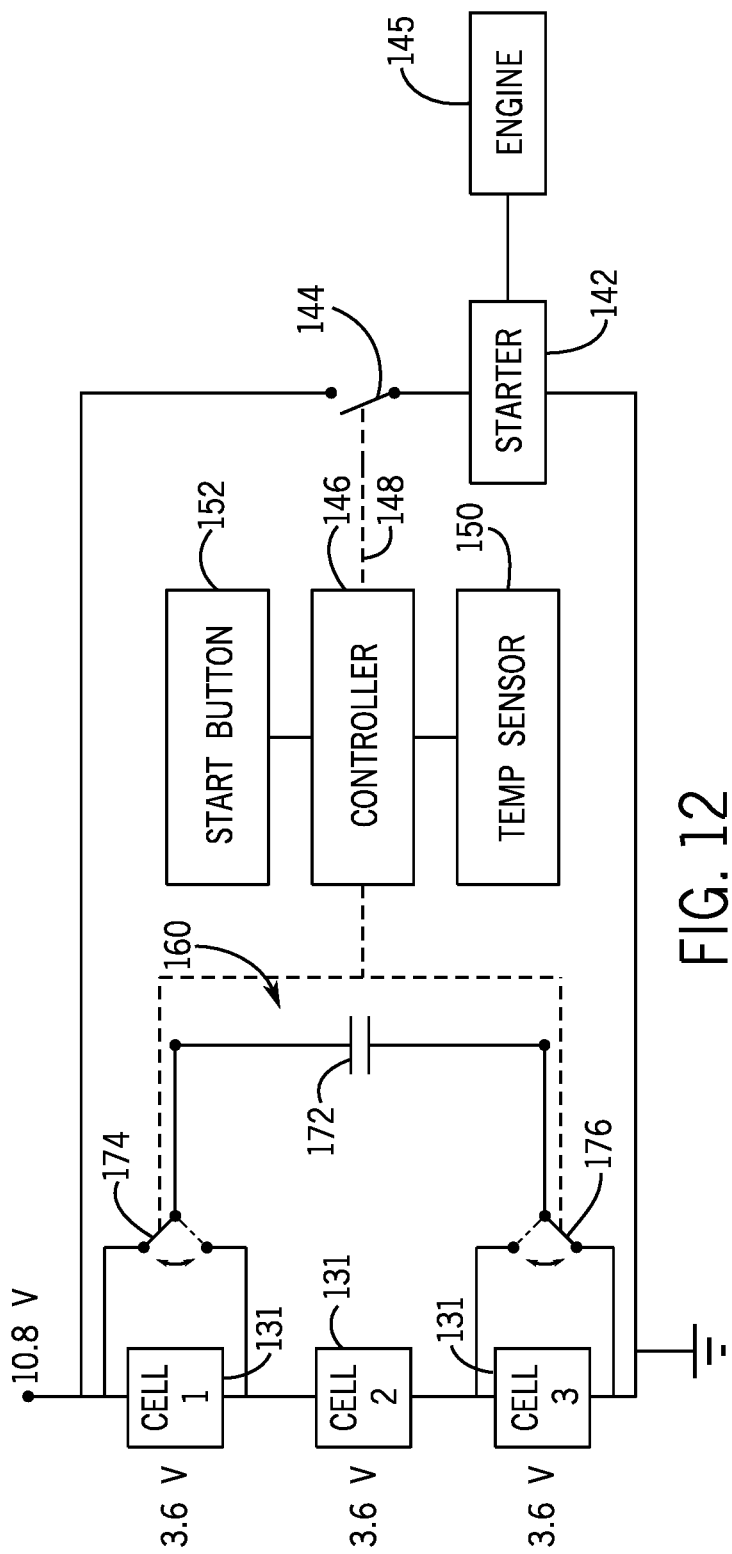
FIG. 12 illustrates a third embodiment of a circuit used to self-heat the starter battery pack.

FIG. 12 illustrates yet another embodiment in which the storage circuit 160 is comprised of only a single capacitor 172. The single capacitor 172 is charged by the string of three cells 131 (10.8 volts). By connecting, disconnecting and switching connections created by the switches 174 and 176, current can be directed into and out of the single and dual cell strings. For example, 10.8 volts can be discharged from the three cells into the capacitor 172. Thereafter, some current from the 10.8 volt charged capacitor 172 could be directed back into cells 2 and 3 to recharge the cells. Selectively positioning the switches 174, 176 could then direct charge into cells 1 and 2, and then finally any remaining charge can be directed into the individual cells 1, 2 or 3 to keep the cells balanced. As with the embodiment of FIG. 11, the movement of electrons from the individual cells 131 to the storage capacitor 172 will heat the cells 131.

Figure 13:
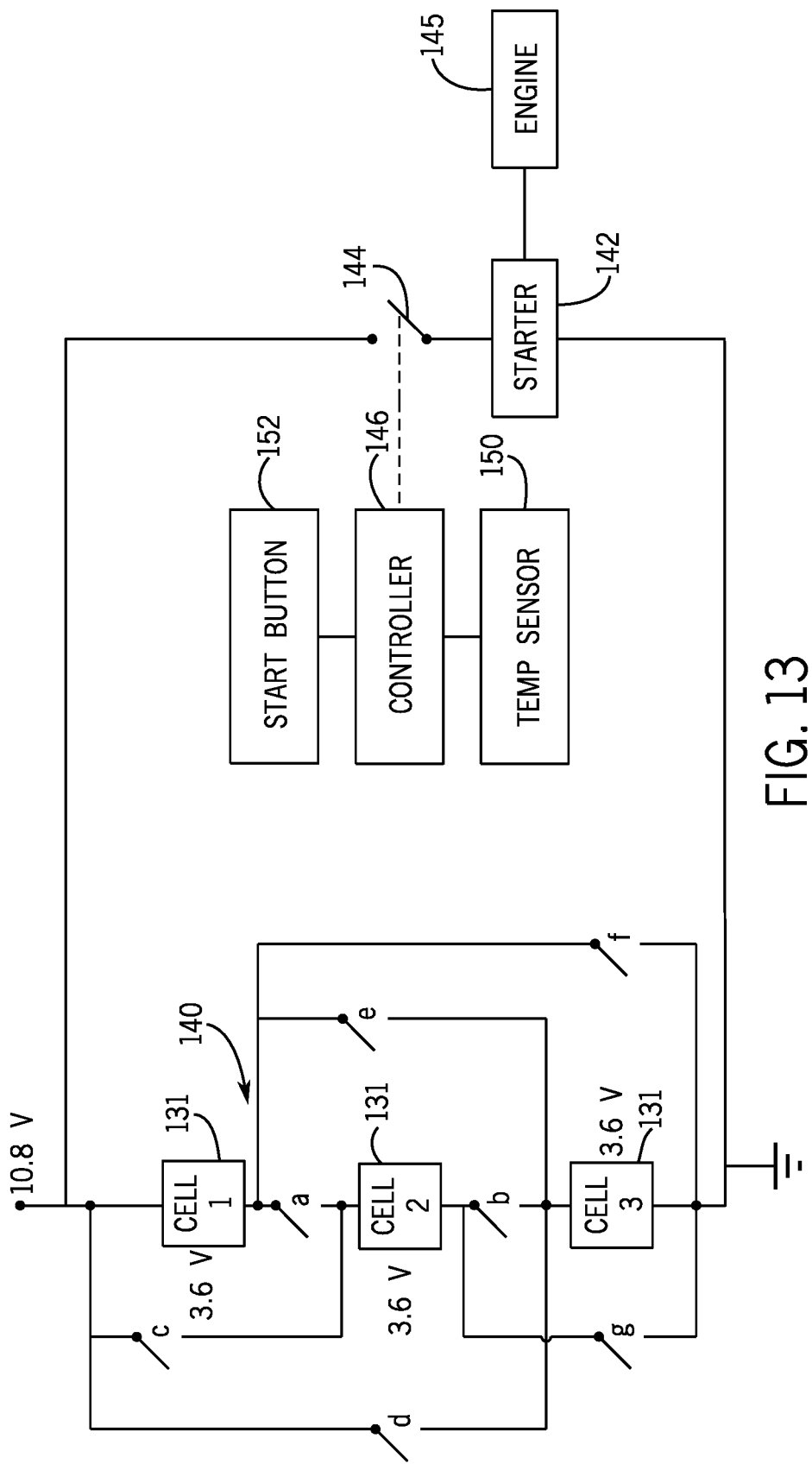
FIG. 13 is a fourth embodiment of a circuit used to self-heat the starter battery pack.

FIG. 13 illustrates yet another embodiment for self-heating the battery 140 formed by the three cells 131. In this embodiment, the cells 131 are configured and connected through a series of switches a-f that are controlled by the controller 146. The controller can selectively position the switches a-f such that the cells can charge and discharge between themselves without the need for any external capacitors or any other type of electron storage device. The design shown in FIG. 13 requires multiple switches a-f to control the flow of electrons between the cells 131. As with the embodiment of FIG. 11, the movement of electrons from the individual cells 131 to the storage capacitor 172 will heat the cells 131.

Figure 14:
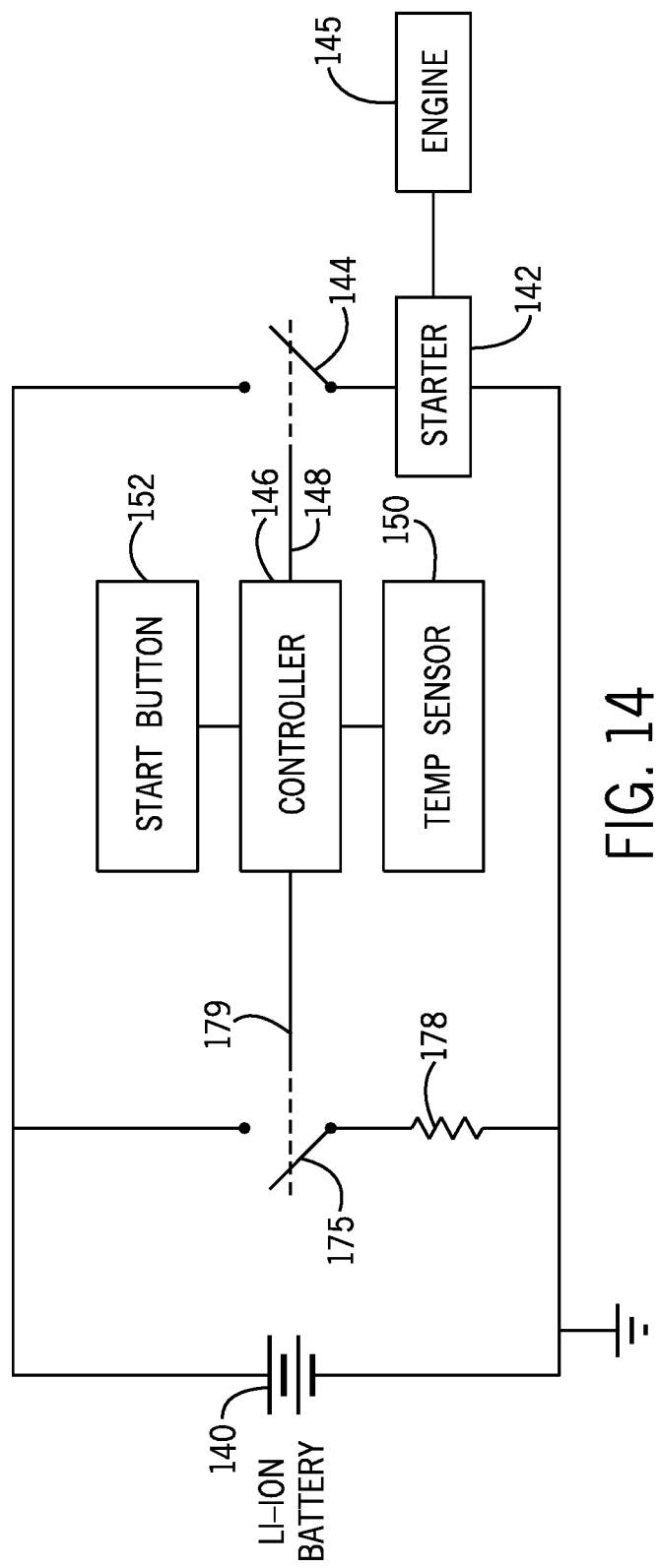
FIG. 14 is a fifth embodiment of a circuit used to self-heat the starter battery pack.

FIG. 14 illustrates yet another embodiment for self-heating the battery 140. In the embodiment shown in FIG. 14, the controller 146 controls the position of a switch 175 through a control line 179. When the switch 175 is closed and the switch 144 is open, electrons from the battery 140 flow through the resistor 178. The resistor 178 is sized such that only a relatively minimum amount of energy is wasted through the resistor 178. The flow of electrons from the battery 140 to the ground through the resistor 178 causes the battery 140 to increase in temperature.

In the embodiments shown in FIGS. 10-14, various different circuits are illustrated that allow the lithium ion battery pack to self-heat due to the flow of electrons and, in the case of FIG. 10, through an external heating pad. Although embodiments are illustrated, it is contemplated that the hardwire connections could eventually be replaced with wireless connections and the b of switches, capacitors and battery cells could change depending on design considerations.

All of the concepts shown in the drawing Figures require a microcontroller or logic circuit to control the switches and to insure that the cells stay balanced. The microcontroller is often used to provide lithium-ion battery management. The microcontroller or logic circuitry would also monitor temperature and may only engage the warming function when necessary below a threshold temperature). Lower temperatures would dictate an increase in electron cycling to generate additional warming.

It is contemplated that the self-warming circuit shown in the drawings may operate utilizing several different control schemes. In one embodiment, the self-warming circuit will engage independently when the temperature drops below a threshold value, even if the start button has not been depressed. In this embodiment, the battery will warm to an optimal temperature and wait for the start button to be depressed. Although this type of operation may waste energy, it would insure that the battery pack is ready to start the snowblower before the user depresses the start button.

Alternatively, the self-warming circuit could warm the battery pack to an intermediate temperature and wait for the start button to be depressed. Upon activation of t start button, the battery pack would be warmed to the optimal temperature prior to starting. This embodiment would conserve electron transfer as compared to the embodiment that warmed the battery pack to the optimal temperature during ultra cold temperature.

In yet another alternate embodiment, the control system would wait for the start button to be depressed and only then warm the battery pack. After the battery pack is warmed, the engine starter would be cranked to start the engine. This control scheme would slightly delay the engine starting after the start button was depressed.

Although the present disclosure has been described with reference to example embodiments, workers skilled in the art will recognize that changes may be made in form and detail without departing from the spirit and scope of the defined subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in technology are foreseeable. The present disclosure described with reference to the example embodiments and set forth in the following definitions is manifestly intended to be as broad as possible. For example, unless specifically otherwise noted, the definitions reciting a single particular element also encompass a plurality of such particular elements.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A snowthrower comprising:
an internal combustion engine;
an impeller rotatable by the internal combustion engine;
an electric starter motor coupled to the internal combustion engine to start the internal combustion engine;
a battery receptacle mounted on a handle of the snowthrower; and
a removable starter battery pack including a plurality of lithium ion battery cells surrounded by an outer housing, wherein the outer housing of the starter battery pack is received in the battery receptacle positioned on the snowthrower, wherein the battery receptacle electrically couples the removable starter battery pack to the starter motor to provide electric power to the starter motor to start the internal combustion engine.

2. The snowthrower of claim 1, wherein the battery receptacle is mounted in a control panel mounted to the handle of the snowthrower.

3. The snowthrower of claim 1 further comprising an activating device selectively operable to electrically couple the starter battery pack and the starter motor.

4. The snowthrower of claim 3 wherein the activating device is a push-button switch.

5. The snowthrower of claim 1 wherein the starter battery pack and the battery receptacle are uniquely associated with each other.

6. The snowthrower of claim 1 further comprising:
a battery heating circuit electrically coupled to the starter battery pack, wherein the battery heating circuit selectively heats the starter battery pack to elevate the temperature of the starter battery pack; and
an activating device operable to selectively electrically couple the starter battery pack to the battery heating circuit to heat the starter battery pack and to selectively couple the starter battery pack to the electric starter motor through the battery receptacle.

7. The snowthrower of claim 6 wherein the battery heating circuit includes a controller coupled to the activating device and operable to selectively supply electric power from the starter battery pack to heat the starter battery pack.

8. Outdoor power equipment comprising:
an internal combustion engine;
an electric starter motor coupled to the internal combustion engine to start the internal combustion engine;
a battery receptacle; and
a removable starter battery pack including a plurality of lithium ion battery cells surrounded by an outer housing, wherein the outer housing of the starter battery pack is received in the battery receptacle, wherein the battery receptacle electrically couples the removable starter battery pack to the starter motor to provide electric power to the starter motor to start the internal combustion engine.

9. The outdoor power equipment of claim 8 further comprising an activating device selectively operable to electrically couple the starter battery pack and the starter motor.

10. The outdoor power equipment of claim 9 wherein the activating device is a push-button switch.

11. The outdoor power equipment of claim 8 wherein the starter battery pack and the battery receptacle are uniquely associated with each other.

* * * * *